United States Patent Office 3,520,383
Patented July 14, 1970

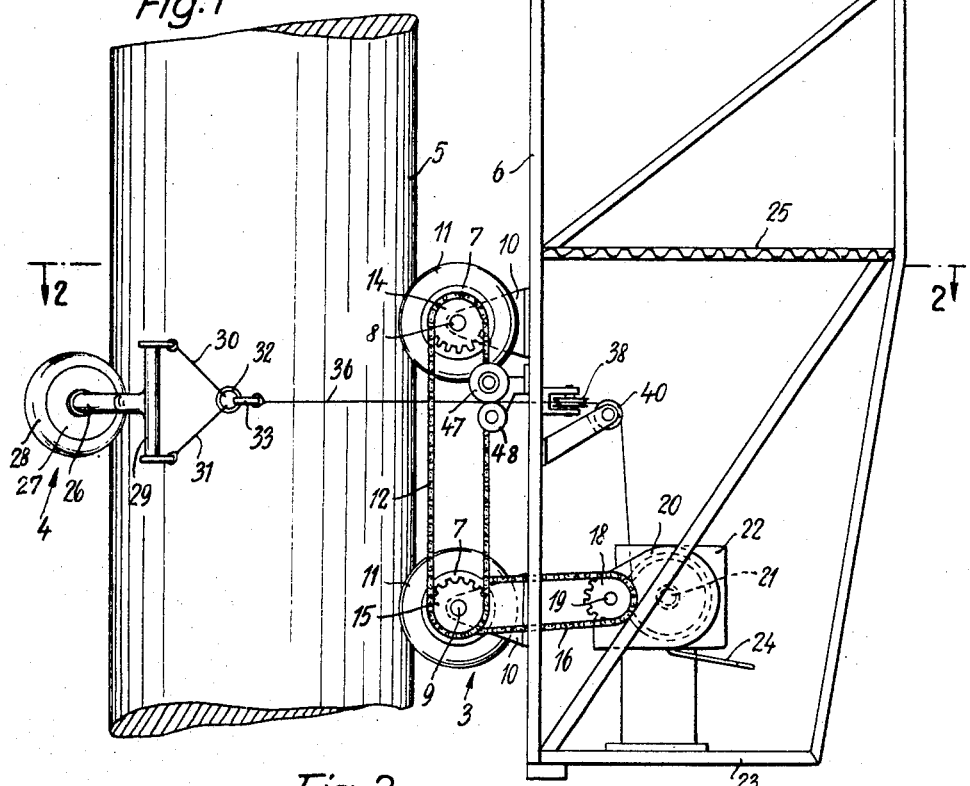
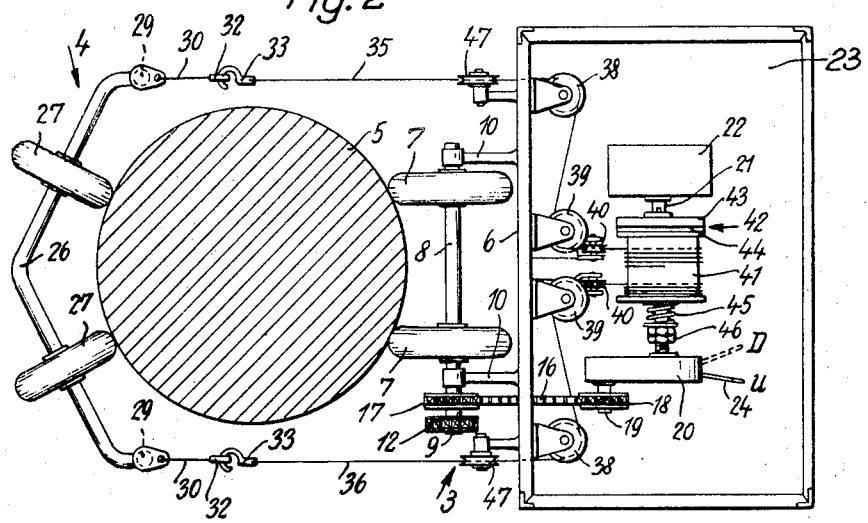
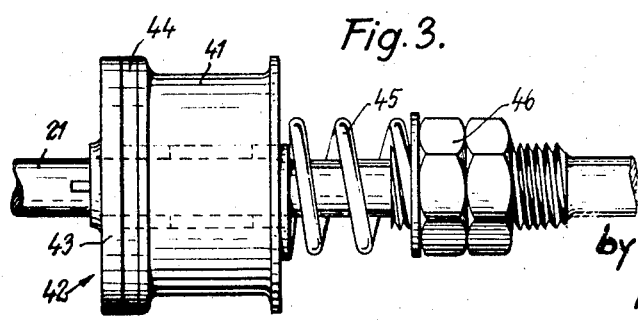

3,520,383
APPARATUS FOR CLIMBING POLE-LIKE OBJECTS
Willi Löock, 40 Rotenhofer Weg,
237 Rendsburg, Germany
Filed Oct. 29, 1968, Ser. No. 771,572
Int. Cl. A63b 27/00
U.S. Cl. 182—133                  7 Claims

ABSTRACT OF THE DISCLOSURE

Apparatus for climbing pole-like objects like masts, trees and chimneys and carry a workman and his equipment, includes a carriage having a platform for the workman, at least two pairs of laterally directed driving wheels journaled on the carriage with one pair of wheels above the other, a motor on the carriage for driving the driving wheels through a reversible transmission, and a holding device which has an axle frame on which a pair of running wheels are freely rotatably and held in angular relation and a pair of steel cables extending from the ends of the axle frame to the carriage, on which they pass over idler pulleys and thence to a winding drum which is driven from the same motor through a sliding transmission to impose a desired torque on the drum tending to tighten the cables. The holding device may have a releasable coupling, such as a hook at the ond of each cable engageable with rings on the axle frame. The holding device is positioned to the side of the object opposite to the carriage, whereby tension on the cables presses the carriage through its driving wheels against the object to permit ascent or descent.

---

The invention relates to apparatus for climbing pole-like objects, such as masts, trees, poles, chimneys and the like. By means of the invention the application of ladders or scaffolds to such objects is obviated.

It is known to ascend wooden masts or poles by means of crampons. These have the drawback that the person climbing can carry only objects of limited weight. Further, they cannot be used to climb objects of hard material, such as concrete or brick. One therefore often uses ladders, which are time-consuming and dangerous, especially when tall structures or objects are to be climbed. Vehicle-mounted extensible laders and the like can be used only on firm ground, as in places providing pavement.

Also known are climbing apparatus for upright tree trunks which are provided with a device for stripping bark from the tree and are elevated and moved about or along the tree trunk with the aid of one or more motor-driven grippers or tracks. Such gripping means and stripping devices, as well as a seat for the person climbing, who controls the operation, are secured to the side of a spanning structure which includes upper and lower, triangular frames which surround the tree trunk and are jointed as at the ends and middle of each of the three frame sides, the latter providing inwardly projecting apices. These apices are fited with balls or runners which are pressed against the tree trunk by the force of springs interconnecting the jointed parts of the frame sides. The frames, which lie at superposed levels, are interconnected by stays and both frames engage the trunk. This construction requires much structural material, whereby the apparatus is heavy and costly. When the said springs are proportioned or adjusted to press the balls or runners against a trunk part of small circumference with sufficient force to secure the frame, they exert such a great force on the trunk part of largest diameter that the balls or runners are pressed into the wood. When sliding runners are used the friction is considerable. The attachment and detachment of such climbing apparatus to and from the tree trunk are very awkward.

The object of this invention is to provide climbing apparatus having a carriage which is held to the pole-like structure or object to be climbed by means of a holding device which surrounds the said object and is movable upwards and downwards along the object with the carriage. The invention obviates the above-mentioned drawbacks.

In summary, the object is realized, according to the invention, by providing the carriage with at least two pairs of driving wheels, situated one pair above the other, the wheels engaging the pole-like object and extending more or less radially therefrom, and a holding device which includes runnning wheels rotatable on angularly related axes and engage the side of the object opposite to the carriage, the holding device further having a pair of tension members of which at least one is flexible, such as a pair of steel cables, which extend to the carriage on opposite sides of the object, the carriage having means for tightening one or both tension members automatically or by hand, such as a winch having a winding drum.

The tension members are preferably both flexible cables and pass about pulleys on the carriage before reaching to the winding drum.

The driving means is mounted on the carriage, which comprises a chassis having, on the side toward the object to be climbed, not less than two more or less horizontal axles mounted for rotation, one above the other, on each of which axles is attached a pair of driving wheels and which axles are drivingly interconnected, for example by an endless sprocket chain. One of these axles is then arranged to be driven, as by another endless sprocket chain from a motor which is mounted on the chassis.

To accommodate variations in the diameter of the object to be climbed or irregularities in its surface without significant variations in the tension of the tension members, the driving wheels and/or the running wheels on the holding device are advantageously provided with elastic tires, such as solid or pneumatic rubber tires.

To facilitate the attachment of the holding device to and its removal from the object to be climbed, the holding device advantageously includes a releasable coupling means, such as a hook or pair of hooks connected to one or each tension member and engageable with hoops or rings connected to the axle frame of the running wheels.

A reversible transmission is preferably provided between the driving motor and the mechanism for driving the driving wheels, whereby the direction of rotation of these wheels can be changed. In this manner it is possible to cause the climbing apparatus, after ascending along the object, to move downwards along it by reversing the direction of rotation of the driving wheels.

The driving motor is advantageously coupled to the winding drum or winch means by a sliding transmission, and this constitutes an optional but important feature of the invention. The torque transmitted through such a sliding transmission can be regulated by adjusting the tension of a spring in the transmission by which the relatively sliding parts, such as friction plates, are urged together, and it is preferred to employ a sliding transmission having such an adjustment capability. While the driving motor is running, the motor shaft urges the winding drum through the sliding transmission to maintain at all times a predetermined tension on the tension members, whereby the driving wheels are pressed with the required force against the surface of the object being climbed. Any tendency for the winding drum to unwind the tension member when the motor shaft is stationary is opposed by a torque as great or greater than the above-mentioned torque exerted by the rotating motor shaft, since the static coefficient of friction often exceeds the kinetic coefficient of friction.

The same motor is advantageously used to drive the driving wheels and the winding drum. In this case the output shaft of the motor (which may be the output shaft of an internal speed-reducing mechanism provided with the motor) preferably extends through the sliding transmission and the winding drum to the reversible transmission, and the winding drum is mounted on the motor shaft.

The invention will be further described with reference to the accompanying drawings forming a part of this specification and showing an exemplary embodiment, wherein:

FIG. 1 is an elevation of the climbing apparatus and an object being climbed;

FIG. 2 is a section taken on the line 2—2 of FIG. 1; and

FIG. 3 is a plan of the sliding transmission, shown to an enlarged scale.

Referring to the drawings, the apparatus comprises a power carriage 3 and a holding device 4 which extends about the object to be climbed, represented by a mast 5. The carriage includes a chassis having a plate 6 and four driving wheels 7 on the side toward the mast and is positioned relatively to the mast by these wheels. The holding device pushes these driving wheels against the mast.

The four driving wheels 7 are arranged in pairs and are mounted fast on upper and lower axles 8, 9, each axle being rotatably mounted on the plate 6 by bearing blocks 10. The driving wheels 7 have rubber tires 11 for frictional engagement to the mast and have elasticity to be compressed by protrusions on the mast or enter depressions therein. These wheels are parallel and extend generally radially from the mast 5. The two axes are interconnected by an endless sprocket chain 12 which runs on sprockets 14, 15, fixed to the axles. These axles are driven in unison by another endless sprocket chain 16 which runs on sprockets 17, 18, fixed to the lower axle 9 and to a drive shaft 19, respectively.

The drive shaft 19 is the output shaft of a reversible transmission 20 the input which is coupled to the output shaft 21 of a motor 22. This motor may be of any suitable type but is preferably an internal combustion engine and is mounted on a lower, horizontal platform 23 of the chassis. The motor usually contains a suitable speed-reducing mechanism, so that the output shaft 21 rotates at the desired slow speed. The transmission 20, which is also mounted on the platform 23, has a control lever 24 for controlling the direction of rotation of the shaft 19, and can be moved to two positions, indicated by the letters U and D to denote upward and downward movement of the carriage. An upper horizontal platform 25 is provided on the chassis, as appears in FIG. 2, for use by personnel.

The holding device comprises a generally horizontal, rigid, axle frame 26 which provides a pair of angularly related axles on which are freely rotatable running wheels 27. These wheels advantageously have elastic rubber tires 28. The running wheels engage the mast 5 more or less radially on the side thereof opposite to that engaged by the driving wheels. The ends of the axle frame are spaced apart by a distance greater than the diameter of the mast 5. Each end is fixed to the center of a vertical rod 29 to the upper and lower ends of which are attached short wire cables 30, 31, and the ends of these cables are secured to a ring 32. A hook 33, secured to the end of a wire cable 35 or 36, is engaged in each of these rings. These cables constitute the flexible tensioning means. The rings and hooks make it possible to attach and detach the apparatus rapidly to and from the mast 5.

The holding device is situated below the driving wheels 7 on the upper axle 8 and above the driving wheels 7 on the lower axle 9 when the apparatus is positioned for operation. The cables 35, 36, extend nearly horizontally and are in spaced relation to the mast 5 at a level between the upper and lower axles 8 and 9 through openings in the plate 6. In rear of this plate, each cable is led over idler pulleys 38, 39 and 40, the arrangement being symmetrical about the vertical plane through the center of the mast. The end of each cable is secured to a winding drum 41 which is mounted rotatably on the motor output shaft 21 and constitutes a winch adapted to apply automatically a predetermined tension to the cables. To this end the drum is axially slidable on the shaft 21 and coupled thereto by a sliding transmission 42, which includes a friction plate 43 fixed to the shaft 21 and a friction plate 44 which is fixed to the drum 41. The latter plate (and the drum) are urged by a spring 45 against the plate 43, the spring acting against the drum and against an adjustable nut 46 (backed up by a lock nut) on the shaft 21. It will be understood that, by adjustment of the nut 46, the force of the spring 45 can be varied, so that the torque transmitted from the shaft 21 to the drum 41 can be adjusted. Thereby the drum applies at all times that the shaft 21 is turning a predetermined tension to the holding device through the cables 35, 36. Consequently, the running wheels 27 are pulled against the far side of the mast 5 with a constant force, whereby the driving wheels 7 similarly bear on the mast with a constant force.

Sliding transmissions of various constructions are known, and the specific arrangement described for the transmission 42 is not essential to this invention.

In operation, to ascend an object such as the mast 5, the apparatus is placed near the object in the position shown, with the carriage 3 near it, and the hooks 33 on the cables 35, 36, are engaged to the rings 32 on the axle frame 26. The motor 22 is then placed into operation with the lever 24 in the U (up) position, causing the winding drum 41 to be rotated through the sliding transmission 42 until the cables 35, 36 are tensioned to the extent that the sliding transmission slips. This presses the driving wheels 7 and the running wheels 27 against the mast with sufficient force to give traction to the driving wheels. When this state has been reached the transmission plate 43 slides over the plate 44 without further rotating the drum but maintaining a torque on the drum in accordance with the adjustment of the nut 46, thereby maintaining tension on the cables. The driving wheels are at the same time driven by the transmission 20, the endless chains 12 and 16, and the climbing apparatus rises along the mast propelled by the driving wheels. Some additional rotation of the drum may occur if the diameter of the mast is not uniform.

When the desired height has been reached, the driving motor 22 is shut off; then the resistance of the motor and its speed reducer oppose rotation of the output shaft 21 with sufficient force to prevent the cables 35, 36 from becoming slack. However, optionally a brake can be provided, on the drum or on the cables.

When disconnecting the hooks from the rings 32 while detaching the climbing apparatus from the mast 5, it is desirable to prevent the cables 35, 36, from becoming so loose that they fall from the idler pulleys 38–40, thereby to avoid the irksome job of threading these cables again over these pulleys when the apparatus is next put to use. This is prevented by passing each cable 35, 36, between a pair of spring-pressed brake rollers 47, 48, which restrain the cables against movement with only a small force. These brake rollers thereby keep the sections of the cables between themselves and the winding drum 41 taut when the hooks 33 are disengaged.

I claim as my invention:

1. In apparatus for climbing pole-like objects which includes a carriage and a holding device which, together with the carriage, encircles the object and holds the carriage adjacent to the object, the improvement wherein:

(a) the carriage includes at least two pairs of driving wheels situated one pair above the other and positioned to engage said object while extending therefrom in a generally radial direction,
(b) the holding device includes a pair of running wheels, means positioning said running wheels in relatively angularly related positions so as to engage the object on the side thereof opposite to said driving wheels, and tension members connected to said wheel-positioning means so as to lie in spaced relation to and on opposite sides of the object and extending to the carriage, at least one of said members being flexible,
(c) means for varying the length of at least one of said tension members while in tension to accommodate objects having different diameters along their lengths, and
(d) means on the carriage for applying tension at least to said flexible tension member independently of the length of the tension member of subparagraph (c).

2. Apparatus according to claim 1 wherein both tension members are flexible cables and extend about idler pulleys on the carriage and thence to winding drum means.

3. Climbing apparatus according to claim 1 wherein the holding device includes releasable coupling means to permit the holding device to be secured about and detached from said object.

4. Climbing apparatus according to claim 1 wherein the carriage comprises a chassis having at least one platform, at least two substantially horizontal axles mounted rotatably thereon at different levels at the side toward the object to be climbed, one of said pairs of driving wheels being fixed on each of said axles, means drivingly interconnecting said axles for rotation in unison, a motor on the carriage, and coupling means for rotating said axles by the motor.

5. Climbing apparatus according to claim 1 wherein the carriage comprises a chassis, a motor on said chassis, and a reversible transmission connected to be driven by said motor and to drive said driving wheels, for changing the direction of rotation of the driving wheels.

6. Climbing apparatus according to claim 1 wherein the means for applying tension to the tension member includes a motor, a winding drum on which at least one of said tension members is wound, and sliding transmission means for coupling said motor to the winding drum so as to apply to the drum a torque tending to shorten said tension member.

7. Climbing apparatus according to claim 6 wherein the motor has an output shaft which extend through the slide transmission means to the reversible transmission, and the winding drum is mounted on the said output shaft.

References Cited
UNITED STATES PATENTS

| | | | |
|---|---|---|---|
| 1,299,289 | 4/1919 | Berg | 182—133 |
| 2,541,767 | 2/1951 | Jones | 182—133 |
| 2,654,638 | 10/1953 | Elliot | 182—133 |
| 3,237,720 | 3/1966 | Landquist | 182—133 |
| 2,030,840 | 2/1936 | Allen | 182—187 |

REINALDO P. MACHADO, Primary Examiner

U.S. Cl. X.R.

182—187